United States Patent [19]

Belanger et al.

[11] Patent Number: 4,824,746
[45] Date of Patent: Apr. 25, 1989

[54] THIN ELECTRODE SUPPORTED ON ELECTRONICALLY CONDUCTIVE SHEET AND PROCESS OF MANUFACTURE

[75] Inventors: André Belanger, Sainte-Julie; Michel Gauthier, Laprairie; Michel Robitaille, Sainte-Julie, all of Canada

[73] Assignee: Hydro-Quebec, Quebec, Canada

[21] Appl. No.: 166,980

[22] Filed: Mar. 11, 1988

[30] Foreign Application Priority Data

Mar. 11, 1987 [CA] Canada .................................. 531715

[51] Int. Cl.⁴ .............................................. H01M 4/04
[52] U.S. Cl. ...................... 429/218; 29/623.5; 427/366; 427/432; 427/178
[58] Field of Search ............... 427/177, 115, 178, 211, 427/319, 356, 366, 428, 431, 432, 434.2, 357; 29/623.5; 429/218, 209

[56] References Cited

U.S. PATENT DOCUMENTS

| | | | |
|---|---|---|---|
| 4,109,035 | 8/1978 | Christensen | 427/365 |
| 4,239,817 | 12/1980 | Koenitzer et al. | 427/211 |
| 4,358,481 | 11/1982 | Wallsten | 427/211 |
| 4,603,060 | 7/1986 | Mitsuda et al. | 427/115 |

Primary Examiner—Anthony Skapars
Attorney, Agent, or Firm—Oblon, Fisher, Spivak, McClelland & Maier

[57] ABSTRACT

Process of manufacturing thin electrodes, supported on an electronically conductive sheet, the electrodes being made from an element selected from lithium, lithium alloy, or doped lithium, whose melting point does not differ from the melting point of lithium by ±50° C. and whose thickness is constant, from a roller of the sheet and a source of the element. According to the invention, there is provided a bath of the element in molten state, the sheet is continuously unrolled, a constant quantity of the molten element is continuously applied on one of the two faces of the sheet, so as to produce a film on the sheet, whose thickness is constant and between about 0.1 and about 40μ and whose surface is homogeneous and uniform. The process is carried out in such a manner that the molten element is prevented from solidifying while in contact with the sheet, and the solidification of the element on the sheet takes place after formation of the film on the sheet. Electrode made of a sheet coated with a layer of lithium whose thickness is 0.1 to 40μ.

33 Claims, 3 Drawing Sheets

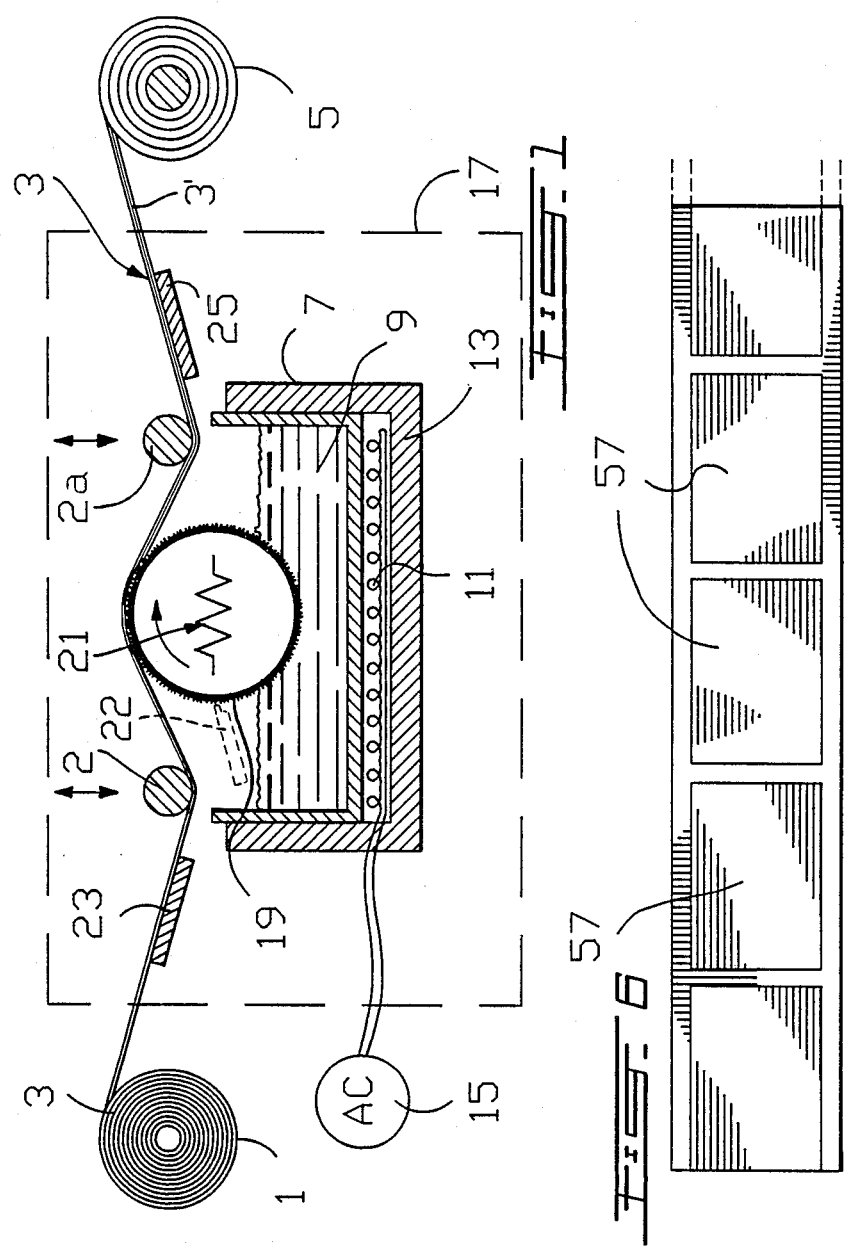

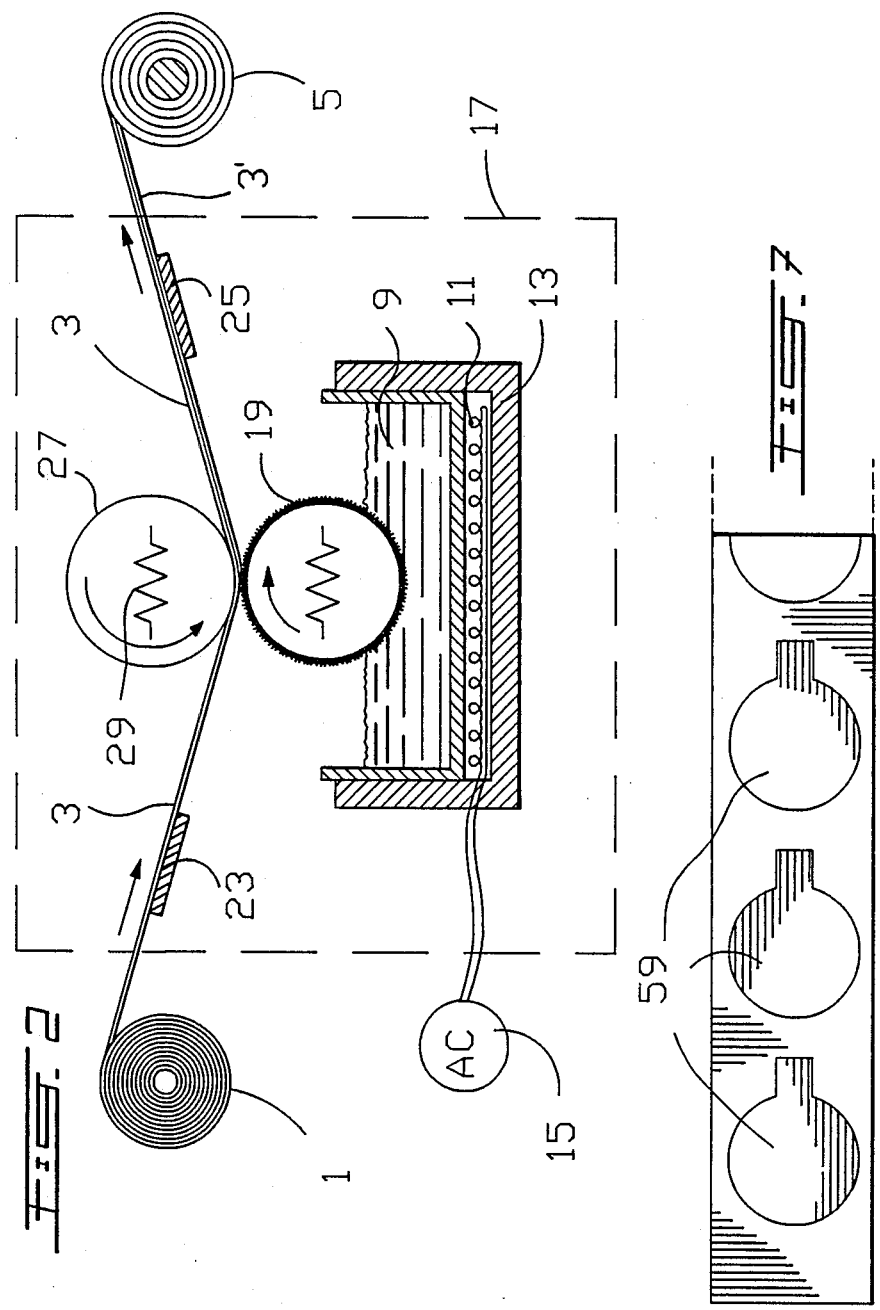

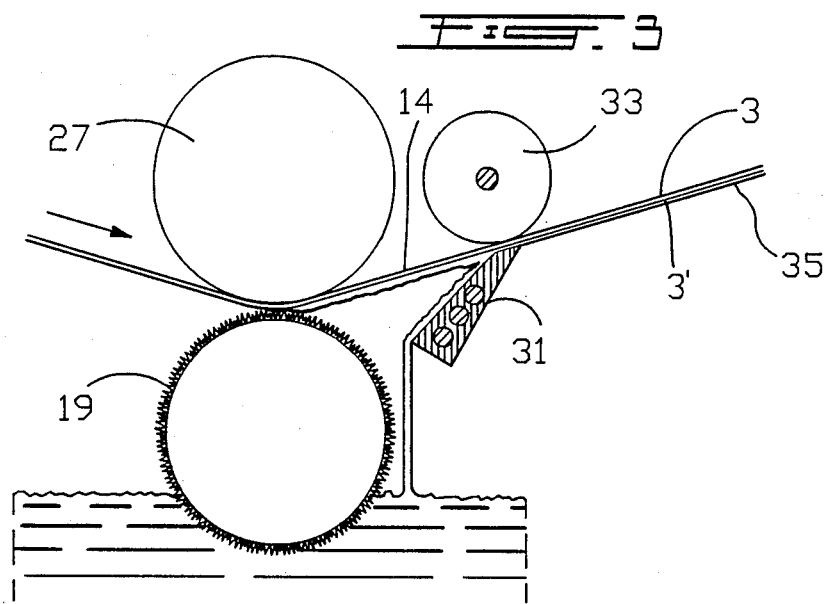
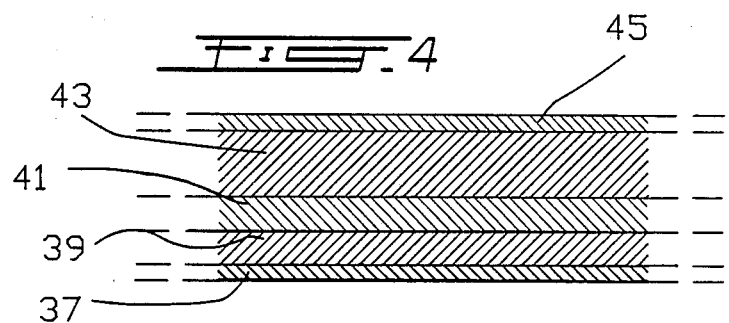
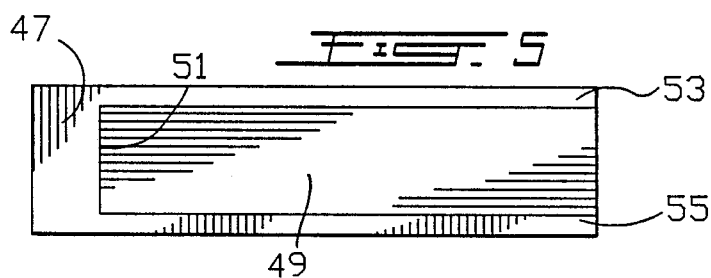

THIN ELECTRODE SUPPORTED ON ELECTRONICALLY CONDUCTIVE SHEET AND PROCESS OF MANUFACTURE

BACKGROUND OF INVENTION (a) Field of the Invention

The present invention relates to thin supported electrodes of lithium and to a process for preparing these electrodes. More specifically, the present invention is concerned with a process for manufacturing thin electrodes of lithium, lithium alloys or doped lithium, which are supported on a sheet of an electronically conductive material, as well as with the electrodes obtained by this process.

(b) Description of Prior Art

Since the advent on the market of rechargeable lithium generators (Moli Energy Ltd., Burnaby, B.C. Canada) and the recent emergence of polymer electrolyte, all solid batteries based on the development of lithium generators have evolved very rapidly in the last few years. These new systems all rely on a technology which is based on thin films where current densities are low with the result that they promote a good redepositing and cycling of the lithium electrodes. This tendency has increased the need to produce thinner and thinner lithium electrodes: $\sim 100\mu$ for liquid-electrolyte batteries and $<30\mu=>\sim 1\mu$ in the case of polymer electrolytes.

The utilization and handling of thin lithium films are relatively easy when the thickness remains about $100\mu$. Commercially produced films are available at a price of the order of US $100 per pound. However, the cost of thinner films increases rapidly since they should then be produced by extrusion followed by lamination; the latter operation is slower and more difficult (high labor cost) with the result that the cost of the lithium produced triples at least. Considering that lithium constitutes a non-negligible portion of the price of the battery, its cost could represent up to 50% of that price. In addition to the higher cost of very thin films ($50\mu$), the film also becomes difficult to handle because of the high deformability of lithium resulting from its malleability and its adhesiveness to most usual materials. This means that thin lithium films are extremely difficult to handle in continuous processes of assembling batteries made of superposed films: electrode (+)/electrolyte/lithium electrode.

The technology involved in manufacturing polymer-electrolyte lithium batteries of specific concern in the present invention, is particularly demanding in this respect, since the required thicknesses of lithium, with respect to the characteristics of currently known electrolytes, vary between 30 and about $1\mu$. Means of overcoming this difficulty are known, such as the utilization of double-sided negative electrodes, which allows to use double the required thickness. (Third International Meeting on Lithium Batteries, May 27 to 30, 1986, Kyoto, Japan, Abstract #ST-11). However, if the intention is to produce bipolar type batteries corresponding to the sequence:

Li/Electrolyte/(+)/Ni/Li/Electrolyte/(+)/Ni/Li. . . (+)/Ni, where nickel is chosen as an example, it becomes necessary to rely on very thin films if an excess of lithium is to be prevented. Excess lithium is in fact detrimental to the cost of the raw material and to the density of stored energy, especially in terms of energy per unit volume; this excess becomes even crucial in the case of batteries designed for room temperature operation, where the quantities of lithium required (1-2 $C/cm^2$) are very low and correspond to thicknesses varying between 1 and $5\mu$.

Various processes have been suggested to produce ultra-thin films of lithium, such as when coating a metal collector. This is the case, for example, of lithium deposit by thermal evaporation, by sputtering or by electron beam. However, these techniques are relatively slow and costly, because they are carried out under high vacuum and under conditions of strict cleanliness. Thin films less than 1 $\mu$ thick can thus be obtained.

Other processes exist, such as lamination and deposit by transfer on a metallic support, which have been described in U.S. Pat. Nos. 3,756,789, dated Sept. 4, 1973, Inventor: Alder and 3,721,113, dated March 1973, Inventor: Houseplan, or hot coextrusion with a film of plastic material (European Patent Applications Nos. 0 146 241, Park et al., June 26, 1985 and 0 145 498, Cook et al., June 19, 1985). All these processes have serious drawbacks, especially if an attempt is made to apply them to manufacture rechargeable polymer-electrolyte batteries.

On the other hand, there are methods of plating steel sheets by unrolling the latter in a zinc bath. In this connection, reference is made to the following patents:

Japan No. 57-203758, Nippon Steel
Japan No. 57-203759, Nippon Steel
Japan No. 57-203760, Nippon Steel
GB No. 2,080,340, Nippon Steel
Canada No. 1,145,210, Battelle Memorial Institute The technology proposed in these patents is obviously not adaptable to the production of a thin layer of lithium on a metallic sheet. Galvanization by means of a roller on one side of a steel sheet according to a Nippon Steel process should also be mentioned (L'Usine Nouvelle, December 1986).

For battery applications, the control of the thickness of the lithium films is much more critical than in the galvanization processes. On the one hand, if the lithium layer is too thin, a portion of the collector could be exposed during discharge, resulting in irreversible or at least serious problems during recharge. It is indeed well known that lithium can be redeposited a large number of times (more than 500 cycles) as long as the lithium is redeposited on itself and not on a metallic collector, for example nickel. On the other hand, control of the thickness is absolutely necessary in order to prevent the formation of extra thicknesses during the manufacture of complete batteries since extra thickness is penalizing in terms of cost and accumulated energy. Finally, control of the thickness is necessary in order to ensure a precise balance of the surface capacitance ($C/cm^2$) of the electrodes when the batteries are mounted in series; otherwise the capacitances of the individual batteries would progress differently during recycling.

The present invention is intended to overcome the above-mentioned difficulties in the use of lithium electrodes and to produce lithium films of various thickness, for example between 40 and about $0.1\mu$, rapidly, economically, and in a particularly reproducible manner from one batch to the other.

The present invention also intends to take advantage of the outstanding wetting properties of molten lithium, lithium alloys or doped lithium when used in association with metals such as nickel and copper.

An object of the present invention is to develop a rapid process for producing rolls of lithium spread on a support, preferably metallic or made of other metallized or heat-resistant materials, by using the high speed wetting properties of thin sheets of lithium, at thickness between about 1 and 20μ.

Another object of the present invention is to benefit from the speed of the process to reduce the time of contact between molten lithium and the support material and to prevent any chemical or thermal attack by the molten lithium.

Another object of the present invention consists in controlling the device used and the unwinding speed of the preferably metallic sheet so as to allow lithium to undergo thermal treatments. Examples include the control of the rate of solidification (micro-cristallinity of lithium), or of the chemical treatments.

Another object of the present invention is to manufacture supported lithium electrodes intended for polymer-electrolyte batteries using molten lithium applied by methods that allow a strict control of the thickness of the lithium deposit.

Another object of the present invention is to ensure thin and reproducible deposits by controlling the thickness and, therefore, the capacitance of the lithium layer; on the one hand, this will reduce the excess of lithium and, on the other hand, it will ensure good electrochemical operation during the cycling of the lithium electrode and of the battery.

SUMMARY OF INVENTION

In a broad sense, the invention relates to a process for manufacturing thin electrodes supported on an electronically conductive sheet, which are made from an element selected among lithium, a lithium alloy and doped lithium, whose melting point does not differ from the melting point of lithium by more or less than 50° C., and whose thickness is constant, from a winding of the sheet and a source of said element. According to this process, a bath of the element in the molten state is prepared, the sheet is continuously unwound, and a constant quantity of the element in molten state, maintained under an inert atmosphere, is applied continuously on at least one of the two faces of the sheet, so as to produce a film on the sheet. The film thickness is constant, between about 0.1 and about 40μ, and its surface is homogeneous and uniform. Steps must be taken to prevent the molten element from solidifying on contact with the sheet, and to control the solidification of the element on the sheet after a film has been formed thereon. Obviously, the process is also suitable for the production of a collector which is coated with lithium on both sides. For example, the process according to the present invention can be used for applying a coating of lithium, lithium alloy or doped lithium on a sheet already coated, on the side which does not receive the lithium, with positive-electrode material, or even a positive-electrode material covered with an electrolyte.

According to a preferred embodiment of the invention, the sheet is made of metal, an alloy, a metallized fiberglass, or a metallized or loaded plastic. The preferred metal is copper, nickel, iron or molybdenum. When an alloy is chosen, it is preferably a nickel-, copper- or iron-base alloy; for example, it may be bronze, monel or steel. In practice, a nickel sheet is preferred.

With respect to the molten element, it may be metallic lithium, or compounds or alloys with a high lithium content whose melting point is close to that of lithium, +50° C., for example, lithium alloyed or doped with antimony, bismuth, boron, tin, silicon or magnesium.

According to another preferred embodiment of the invention, the bath is maintained at a temperature varying between the melting point of lithium and about 400° C., and the sheet is unrolled above the bath of molten lithium.

According to another preferred embodiment of the invention, an applicator of molten lithium is allowed to circulate continuously in the bath, where it is applied against the face of the sheet, for example nickel.

The applicator preferably consists of a roller whose axis is parallel to the surface of molten lithium, the base of the roller being immersed in the molten lithium while the upper portion is in contact with the face of the sheet; the surface of the roller is rough allowing the roller to be coated with the molten lithium, alloy or doped lithium, and to transfer the latter, uniformly and at a constant thickness, to the said face of the sheet, such as nickel.

Although this surface roughness can be of any kind, it is preferably constituted by regular geometrical patterns which constitute cavities regularly distributed across the roller surface, which collects the molten material and transfers it onto the metallic sheet.

The sheet is preferably unrolled at a speed which varies between about 0.5 and 100 cm/s. Moreover, depending on circumstances, it is possible to heat the roller in order to prevent the molten pure doped or alloyed lithium, from solidifying before being deposited on the face of the sheet to be covered with lithium.

According to another embodiment of the invention, the sheet undergoes a heat treatment before and/or after the element has been applied on said face.

According to another embodiment of the invention, a scraper is provided for removing any excess molten material from the surface of the roller before the latter is applied to the face of the metallic sheet to be coated.

According to another embodiment of the invention, after the metallic sheet has been coated with molten pure, alloyed or doped lithium, the face is treated with a scraper to smooth out any surface imperfections left by the roller.

Preferably, the lithium bath as well as the sheet, in the vicinity of the lithium bath, are maintained in an inert atmosphere which contains neither oxygen nor water vapor in order to prevent any undesirable reaction.

Obviously, the device described can be modified in order to coat both faces of the metallic collector, if desired, as it will be obvious to anyone skilled in the art.

In another broad sense, the invention concerns a thin supported electrode consisting of an electronically conductive sheet, one face of which sheet is at least partially covered with a layer of an element selected among lithium, a lithium alloy and doped lithium, the layer of the element having a uniform thickness varying between about 0.1 and about 40μ. The surface of the layer is practically free of asperities, and cannot be removed from the sheet by means of a knife.

The electronically conductive sheet can be a metal, an alloy, a metallized fiberglass or a loaded or metallized plastic. For example, it can be made of copper, nickel, iron or molybdenum, nickel-, copper-, or iron-base alloys, such as brass, bronze, steel or monel. Preferably, the material of the sheet is nickel.

The element which constitutes the coating is preferably metallic lithium. This element may also consist of compounds or alloys with a high lithium content and a melting point close to that of lithium to ±50° C., for example, lithium alloyed or doped with antimony, bismuth, boron, tin, silicon or magnesium.

BRIEF DESCRIPTION OF DRAWINGS

The invention will now be illustrated by means of the annexed drawings which are given by way of example and without any intention to limit the invention thereto.

In the drawings:

FIG. 1 is a schematic illustration of a device allowing the process to be carried out according to the present invention;

FIG. 2 is a schematic illustration of another device allowing the process to be carried out;

FIG. 3 is a schematic illustration of a scraper which can be adapted to the devices of FIGS. 1 and 2;

FIG. 4 is a cross-section of a battery incorporating an anode according to the present invention;

FIG. 5 is a view from above of a metal sheet covered with a strip of lithium;

FIG. 6 is another view from above of a metal sheet with a repetitive pattern; and FIG. 7 is another view from above of a metal sheet with another repetitive pattern.

DESCRIPTION OF PREFERRED EMBODIMENTS

The apparatus schematically illustrated in FIG. 1 comprises a spool 1 for feeding a metallized or metallic sheet 3. To take hold of the sheet once the latter has been treated, there is a receiver spool 5 which allows the sheet to be pulled during the treatment to be described later. The apparatus also comprises a bath 7 intended to hold molten lithium 9. To make sure that the lithium 9 will be maintained in the molten state and will remain at a controlled temperature, a heating element 11 is provided as well as thermal insulation 13. It will be noted that the heating element is connected in conventional manner to an alternating current source 15. Finally, schematically illustrated at 17 is a zone where the bath and the sheet 13 being treated will be maintained under a controlled atmosphere so as to eliminate oxygen, water vapor and other gases which could react with lithium. This zone is completely conventional and forms no part of the invention.

The applicator used to apply a film of molten lithium 3' on the underside of the metallic sheet 3 comprises a textured roller 19 whose surface pattern, because of its capillarity, allows the lithium to be deposited on the underside of the sheet 3. The textured roller 19 is also provided with conventional heating means 21 for adequately controlling the temperature of the molten lithium on the surface of the roller. In addition, if desired, there could be provided a scraper 22 (illustrated in dotted lines in FIG. 1) enabling any excess molten material to be removed from the surface of the roller before the latter is applied to the surface 3 of the metal sheet to be coated.

To ensure adequate contact between the sheet and the roller 19, rods 2,2a are provided which are applied against the upper face of the sheet 3 and allow the angle of contact between the sheet 3 and the roller 19 to be adjusted. Before the sheet 3 reaches the zone defined by the molten lithium, there is provided a temperature conditioner 23 for adjusting the temperature of the sheet as it arrives above the bath of molten lithium. Similarly another temperature conditioner 25 is provided which is adjusted to heat or cool the Li°/sheet couple before the sheet is rolled onto spool 5.

A modification of the apparatus schematized in FIG. 1 is illustrated in FIG. 2. In this embodiment, where the parts common to those in the apparatus illustrated in FIG. 1 are identified by the same reference numbers, it will be seen that there is provided a roller 27 which allows the metal sheet 3 to be pulled between the rollers 19 and 27. Roller 27 is provided with heating means 29 to ensure an adequate temperature of the sheet when the latter is being treated.

Referring now to FIG. 3, it will be seen that the device illustrated in FIG. 2 can be provided with a scraper 31 for reducing the thickness and/or removing surface imperfections which may have been left by the roller 19. This additional device must be kept sufficiently hot to make sure that the excess material which has been scraped off returns to the bath while still in liquid condition. This is made possible by providing the scraper 31 with conventional heating means (not shown). Moreover, in order that the scraped surface be thoroughly homogeneous, there is provided a rest roll 33 immediately above the scraper 31. The homogeneous surface of the lithium-coated sheet is illustrated at 35. The heated scraper is particularly useful when significant thicknesses of lithium are deposited, in which case, the pattern of the engraving roller risks leaving marks on the lithium after cooling. The heated scraper 33 can eliminate these surface imperfections.

The product obtained according to the present invention can be used to make a battery as illustrated in FIG. 4. It will be seen that the latter comprises a copper collector 37 whose thickness is about $10\mu$. The thickness of the lithium layer 39 obtained by the process according to the invention is about $20\mu$. The battery also comprises a polymer electrolyte 41 whose thickness is $20\mu$, a positive electrode 43, $40\mu$ thick and a copper collector 45, $10\mu$ thick, forming a total thickness of $100\mu$.

Examples of sheets covered with strips of lithium are illustrated in FIGS. 5, 6 and 7. In FIG. 5, metallic lithium 49 is applied on the metallic sheet 47. The start of the strip is illustrated at 51 while the two uncoated strips are identified by the reference numbers 53,55. If it is desired to obtain nickel sheets coated with repeat lithium pattern, an applicator roller 19 can be used whose pattern will serve to produce the repeats 57. Obviously, other patterns can be used in lieu of the one illustrated in FIG. 6, for example, the one illustrated in FIG. 7 at 59.

The invention will now be illustrated by means of the following examples which are given without intention to limit the invention thereto.

EXAMPLE 1

A spool containing a sheet of electrolytic copper (width: 7.6 cm, thickness: $25\mu$) was used to prepare lithium electrodes. The device selected was the one illustrated in FIG. 1 enclosed in a glovebox (under an atmosphere of helium), $H_2O < 10$ ppm and $O_2 < 10$ ppm. The sheet was placed as shown in FIG. 1. The unwinding operation, performed by activating the pulling roller was set at a speed of 2 cm/s. The stainless steel applicator roller, 7 cm wide, was placed at the centre of the sheet of copper. The roller diameter is 2.5 cm and its surface pattern has the following characteristics: 200 counts; 24-ohm depth, with a pyramidal design having a volume=5.0, according to the description by INTA ROTO Inc. of Richmond, Va. The temperature of the lithium bath is maintained at 260° C. during the test. About 30% of the volume of the roller sits in the liquid. The stainless steel container whose dimensions are 10×5×2 cm contains about 50 cc of "Battery" quality lithium. The conditioning plates (23 and 25) are not used for this test. In this way, about 10 m of lithium coating on copper are produced and wound onto the receptor roller.

The lithium thus obtained has a highly metallic aspect with a surface free from defects (smaller than 0.5μ). The edges of the lithium on the copper are straight and burrless.

The average thickness of the lithium is 5μ and is very regular; the variations are less than 0.5μ in all directions.

The amount of lithium used is of the order of 3 cc for a thickness of 5μ.

It should be noted that to produce larger quantities of lithium in a continuous process, it suffices to regularly add fresh lithium to the container.

EXAMPLE 2

For this example, the same device as in example 1 was used, except that there is used an "inking" roller whose surface pattern is slightly more pronounced: i.e.: 25 counts, 330 ohm in depth, vol=72, the pattern again being pyramidal. The same experimental conditions were used: speed=2 cm/s, bath temperature=260° C. The resulting thickness of the lithium on copper was 8μ on average, which, in terms of lithium consumption, corresponds to 7 cc 10 m, or 14 A.h of electrical charge. The bath and its immediate surroundings are maintained under helium while the receiving spool is kept under dry air (dew point lower than −25° C. at 70° C.).

EXAMPLE 3

Still using the device of FIG. 1, the sheet unwinding speed was increased by a factor of five (to about 10 cm/s) and the same resulting thickness of the lithium was obtained by preheating a nickel sheet (7 cm wide, 8μ thick) to 300° C. by means of the temperature conditioner 23 and by heating the "inking" spool to 300° C. while maintaining the temperature of the bath 9 at 260° C. A small helium jet was used at 25 to cool the Li/Ni assembly before it reached the winding spool.

EXAMPLE 4

The lithium produced in Example 1 was used to assemble small batteries (4 cm²). A 4 cm² disk was punched out of the product obtained in example 1. On this lithium disk was deposited an electrolyte film 75μ thick consisting of a mixture of polyethylene oxide and lithium perchlorate in a ratio of 20/1. A positive electrode with a $TiS_2$ base on a nickel collector, having a surface capacitance of 1.5 C/cm², was placed on this half battery. When the temperature of the battery thus constituted was raised to 80° C., the battery could be recycled more than 100 times without any apparent loss of lithium.

EXAMPLE 5

Using an electrolyte with a conductor, for example replacing the polyethylene oxide with a synthetic copolymer such as described in Canadian Patent Application No. 479,862 of Apr. 23, 1985, which has a thickness of 50μ, it was possible to reach 50 deep discharges and charges without any appearance of dendrites or other signs of malfunctioning of the lithium electrode.

EXAMPLE 6

By using the lithium electrode prepared in accordance with example 2, another 4-cm² battery was prepared with a copolymer-base electrolyte but using a positive electrode of $V_6O_{13}$ with a higher capacitance: 5 C/cm². With 10μ of lithium (i.e. 7.3 C/cm²), which means about 50% lithium vs the positive electrode, it was possible to obtain 75 deep cycles at 60° C. without any dendritic growth or other phenomenon that could be associated with the malfunctioning of the lithium electrode.

EXAMPLE 7

By means of the thin lithium film prepared as in example 3, a battery of over 50 V was assembled by superposing 17 elementary batteries in series, with a voltage of about 3.5 V per unit.

In this example, the positive electrode was made of $MnO_2$ and the electrolyte has a copolymer base as described above. The main feature of this assembly is the exceptionally small thickness of the battery: less than 1 mm.

We claim:

1. Process for manufacturing thin electrodes supported on an electronically conductive sheet, said electrodes being made from an element selected from the group consisting of lithium, lithium alloy and doped lithium, whose melting point does not differ from the melting point of lithium by ±50° C., the thickness of said element being constant, from a roll of said sheet and a source of said element, which comprises providing a bath of said element in molten state and keeping said bath under an inert atmosphere, continuously unwinding said sheet, continuously applying on at least one of the two faces of said sheet, a constant quantity of said element in molten state, so as to produce a film on said sheet whose thickness is constant and between about 0.1 and about of 40μ and whose surface is homogeneous and uniform, preventing the element in molten state from immediately solidifying while in contact with said sheet, and causing a controlled solidification of said element on said sheet after said film has been formed thereon.

2. Process according to claim 1, wherein said sheet is made of a material selected from the group consisting of a metal, an alloy, a metallized fiberglass, a loaded plastic and a metallized plastic.

3. Process according to claim 2, wherein the sheet is made of a metal selected from the group consisting of copper, nickel, iron and molybdenum.

4. Process according to claim 2, wherein the sheet comprises an alloy of nickel, copper or iron.

5. Process according to claim 4, wherein the sheet is made of brass, bronze, steel or monel.

6. Process according to claim 2, wherein the sheet is made of nickel.

7. Process according to claim 6, wherein the element is metallic lithium.

8. Process according to claim 1, wherein the element is an alloy of lithium.

9. Process according to claim 1, wherein the lithium is alloyed or doped with antimony, bismuth, boron, tin, silicon, magnesium.

10. Process according to claim 7, which comprises keeping the bath at a temperature varying between the melting point of lithium and about 400° C.

11. Process according to claim 10, which comprises unwinding the sheet above the bath of molten lithium.

12. Process according to claim 11, which comprises continuously circulating a molten lithium applicator in said bath, and applying said applicator on said face of the sheet of nickel.

13. Process according to claim 12, wherein said applicator comprises a roller whose axis is parallel to the surface of molten lithium, the base of the roller being immersed in the molten lithium while the upper portion is in contact with said face, the surface of the roller comprises asperities allowing the roller to be coated with molten lithium so as to uniformly transfer the latter on said face of the sheet of nickel.

14. Process according to claim 13, wherein the asperities consist of regular geometrical patterns constituting cavities regularly distributed across the roller surface, said cavities collecting the molten material and transferring same on the metallic sheet.

15. Process according to claim 14, wherein the cavities are gauged as a function of the thickness of the layer of pure lithium, lithium alloy or doped lithium.

16. Process according to claim 15, which comprises unrolling the sheet at a speed between 0.5 and 100 cm/s.

17. Process according to claim 15, which comprises heating the roller in order to prevent the molten lithium from immediately solidifying before being applied against said face of the sheet.

18. Process according to claim 1, which comprises thermally treating said sheet before and after having applied the element in molten state against said face.

19. Process according to claim 15, wherein after having coated the metallic sheet with molten lithium, said face is treated with a scraper thereby reducing the thickness of lithium applied and optionally removing surface imperfections left by the roller.

20. Process according to claim 15, which comprises maintaining the lithium bath as well as the sheet, in the vicinity of said lithium bath, under an inert atmosphere containing neither oxygen nor water vapor.

21. Process according to claim 13, which comprises providing a scraper for removing any excess molten material from the surface of the roller before the latter is applied to the face of the metallic sheet to be coated.

22. Thin supported electrode which comprises an electronically conductive sheet, at least one face of which is at least partially covered with a layer of an element selected from the group consisting of lithium, lithium alloy and doped lithium, the melting point of said element being close to that of lithium to ±50° C., the layer of said element having a uniform thickness varying between about $0.1\mu$ and about $40\mu$, the surface of said layer being substantially free of asperities and cannot be removed from the sheet by means of a knife, whenever produced by the process according to claim 1.

23. Electrode according to claim 22, wherein the sheet is made of a material selected from the group consisting of a metal, an alloy, a metallized fiberglass, a loaded plastic and metallized plastic.

24. Electrode according to claim 23, wherein the sheet comprises a metal selected from the group consisting of copper, nickel, iron and molybdenum.

25. Electrode according to claim 23, wherein the sheet comprises an alloy based on nickel, copper or iron.

26. Electrode according to claim 25, wherein the sheet is made of brass, bronze, steel or monel.

27. Electrode according to claim 23, wherein the sheet is made of nickel.

28. Electrode according to claim 27, wherein the element is metallic lithium.

29. Electrode according to claim 22, wherein the element is selected from the alloys of lithium.

30. Electrode according to claim 29, wherein the lithium is alloyed with antimony, bismuth, boron, tin, silicon, magnesium.

31. Electrochemical generator comprising an anode, a cathode as well as an electrolyte wherein the anode is as defined in any one of claims 22, 23 or 24.

32. Electrochemical generator comprising an anode, a cathode as well as an electrolyte wherein the anode is as defined in any one of claims 25, 26 or 27.

33. Electrochemical generator comprising an anode, a cathode as well as an electrolyte wherein the anode is as defined in any one of claims 29 or 30.

* * * * *

UNITED STATES PATENT AND TRADEMARK OFFICE
CERTIFICATE OF CORRECTION

PATENT NO. : 4,824,746

DATED : April 25, 1989

INVENTOR(S) : Andre BELANGER et al

It is certified that error appears in the above-identified patent and that said Letters Patent is hereby corrected as shown below:

Column 2, line 16, delete "Inventor: Houseplan," and insert --Inventor: Housepian,--.

Signed and Sealed this

Twenty-fourth Day of April, 1990

Attest:

HARRY F. MANBECK, JR.

*Attesting Officer*  *Commissioner of Patents and Trademarks*